(12) United States Patent
Dukart

(10) Patent No.: US 7,637,795 B1
(45) Date of Patent: Dec. 29, 2009

(54) SLIDE ACTUATED ANIMAL CALL

(76) Inventor: Michael J. Dukart, 8748 Ridge Crest Dr. NW., Rochester, MN (US) 55901

( * ) Notice: Subject to any disclaimer, the term of this patent is extended or adjusted under 35 U.S.C. 154(b) by 35 days.

(21) Appl. No.: 11/085,955

(22) Filed: Mar. 22, 2005

(51) Int. Cl.
A63H 5/00 (2006.01)
(52) U.S. Cl. ..................... 446/208; 446/207
(58) Field of Classification Search ............... 446/202, 446/204, 206, 207, 208, 209
See application file for complete search history.

(56) References Cited

U.S. PATENT DOCUMENTS

| 333,094 | A | | 12/1885 | Fuller | |
|---|---|---|---|---|---|
| 813,853 | A | | 2/1906 | Brunner | |
| 825,610 | A | | 7/1906 | Olt | |
| 1,484,148 | A | | 2/1924 | Olt | |
| 2,198,993 | A | * | 4/1940 | Felgner | ............... 446/209 |
| 2,544,370 | A | | 3/1951 | Walther | |
| 2,551,367 | A | | 5/1951 | Fahey | |
| 2,555,813 | A | | 6/1951 | Priess | |
| 2,583,400 | A | | 1/1952 | Wade | |
| 2,604,731 | A | * | 7/1952 | Meucci | ............... 446/208 |
| 2,697,298 | A | | 12/1954 | Bacon | |
| 3,066,443 | A | | 12/1962 | Mobley | |
| 3,406,479 | A | | 10/1968 | Faulk | |
| 4,030,241 | A | | 6/1977 | Gallagher | |
| 4,940,451 | A | | 7/1990 | Leady | |
| 5,222,903 | A | * | 6/1993 | Parrott et al. | ............... 446/208 |
| 5,577,946 | A | * | 11/1996 | Oathout | ............... 446/208 |
| 5,643,039 | A | | 7/1997 | McIntyre | |
| 6,039,627 | A | * | 3/2000 | Forbes et al. | ............... 446/208 |
| 6,083,075 | A | | 7/2000 | Meeks | |
| 6,682,388 | B1 | * | 1/2004 | Foster | ............... 446/207 |
| 7,083,492 | B1 | * | 8/2006 | Morocco et al. | ............... 446/208 |
| 2003/0082988 | A1 | * | 5/2003 | Gendron et al. | ............... 446/207 |

* cited by examiner

Primary Examiner—Gene Kim
Assistant Examiner—Urszula M Cegielnik
(74) Attorney, Agent, or Firm—D L Tschida

(57) ABSTRACT

A deer call assembly that mimics sounds ranging from the high pitched sounds of fawns and does to the low-pitched grunts of bucks. The pitch is infinitely adjustable over a range with a slide actuator that manipulates a band restraint that captures a reed to a longitudinally grooved tone board. An arcuate, grooved collar depends to capture the O'ring. The reed is rigidly secured to the tone board at one end with a peg. A preferred reed exhibits peripheral edges that taper outward as the reed extends to a wide billed end where the edges project beyond the longitudinal sides of the tone board.

9 Claims, 2 Drawing Sheets

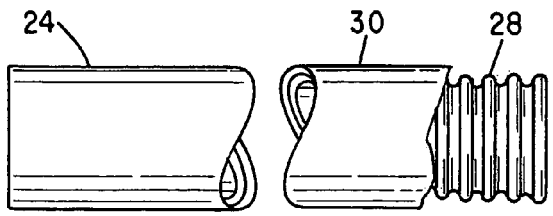
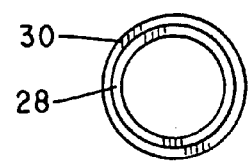
FIG. 9  FIG. 10
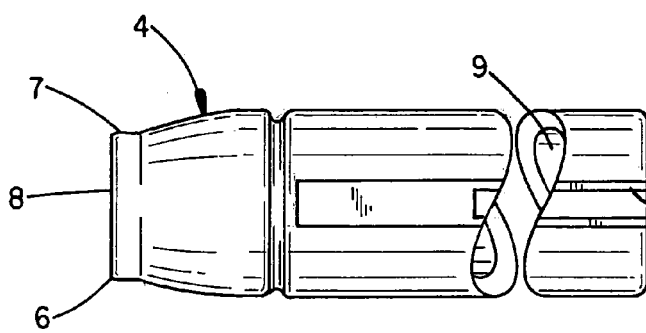
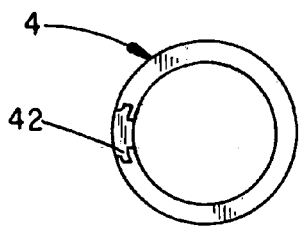
FIG. 2  FIG. 3
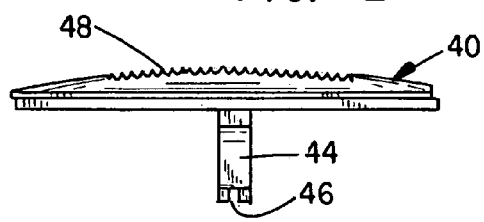
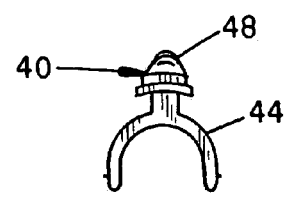
FIG. 13  FIG. 14
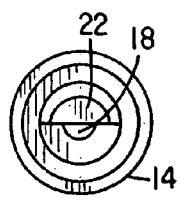
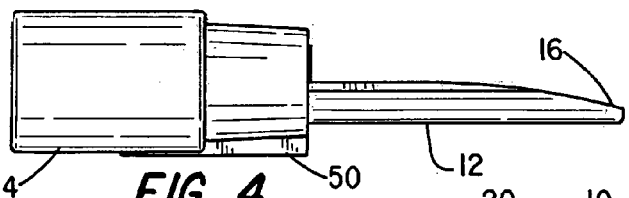
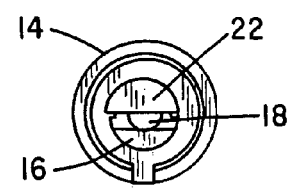
FIG. 6  FIG. 4  FIG. 5
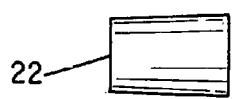
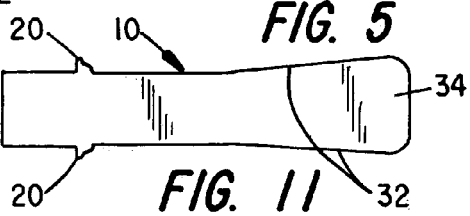
FIG. 7  FIG. 8  FIG. 11
FIG. 12

SLIDE ACTUATED ANIMAL CALL

BACKGROUND OF THE INVENTION

The present invention relates to animal calls and, in particular, to a deer or other game call having a mechanism for manipulating a reed restraint along the length of the reed and an adjacent tone board to vary the pitch of a wide-billed reed secured to the tone board in a support housing.

Numerous types of animal calls have been developed for mimicking different species of birds and animals to attract the bird or animal. Some common birdcalls are designed to attract turkeys, ducks, geese, and crows. Some calls are constructed to "shock" and elicit a response and locate a different species. For example, some response or "shock" calls mimic owls, peacocks, and hawks and which induce tom turkeys or crows to respond. Some calls are constructed to mimic injured prey and attract a predator, for example, rabbit calls to attract coyotes and fox. Many other calls are designed to mimic animals such as squirrel, deer and elk.

Deer, elk, duck and turkey calls are particularly popular with recreational sportsmen. Depending upon the game animal and purpose of the call, the call's physical construction can take a variety of forms and use a wide variety of resonating members. Some whistle-type calls provide air chambers and associated porting. U.S. Pat. Nos. 3,066,443 and 2,697,298 show calls with adjustable air porting.

Some striker calls, such as used to hunt turkeys, provide a wand or other member that is manipulated on a compatible resonating member.

Duck calls commonly use reeds that are rigidly mounted in a surrounding housing. U.S. Pat. No. 3,406,479 discloses a duck call with an o-ring reed retainer. Deer calls are also known that provide multiple grooves and relative to which and upon disassembly an O'ring can be manually adjusted to provide different sounds. The necessary disassembly and re-assembly of these calls can be burdensome and frequently not possible, especially when deer are nearby.

Calls with adjustable reeds are shown at U.S. Pat. Nos. 2,604,731; 2,555,813; and 2,551, 367. Animal calls that use slide-tuning mechanisms are shown at U.S. Pat. Nos. 4,030, 241; 2,697,298; 2,544,370; 2,583,400; 1,484,148; and 825, 610. Calls with adjustable clip and spring tuning assemblies are shown at U.S. Pat. Nos. 5,643,039 and 6,083,075. U.S. Pat. Nos. 813,853 and 333,094, in turn, show threaded, rotary tuning assemblies.

A deer call is shown at U.S. Pat. No. 4,940,451 having a slide-mounted tuning pin that can be manipulated with a finger to-and-fro along a reed. A resonance or sound tube is also shown that can be mounted to the end of the housing to vary the pitch or timber and direct the emitted sound.

The present invention was developed to provide an improved animal call particularly directed to mimic deer sounds. The assembly provides a housing that surrounds a concentric tone board and relative to which a wide billed reed is mounted to resonate. An O'ring is fitted around the reed and tone board and a finger-actuated slide assembly is contained to the housing that permits a to-and-fro manipulation of the o'ring to vary the tone of the elicited sounds without having to disassemble and re-assemble the call.

SUMMARY OF THE INVENTION

It is a primary object of the present invention to provide a reed-type animal call having a mechanism for varying the tones of the call without having to disassemble the call.

It is a further object of the present invention to provide a call wherein the reed is captured beneath an O'ring.

It is a further object of the invention to provide a call wherein a slide actuator captures an O'ring reed restraint and permits an unrestricted reciprocating movement of the O'ring relative to a reed.

It is a further object of the invention to provide a call wherein an arcuate, grooved collar captures an O'ring and is mounted to permit a reciprocating movement of the O'ring.

It is a further object of the invention to provide a call having a reed that flares outward as it extends from an attachment point to a relatively wide bill that extends beyond the sides of a lower lying tone board.

It is a further object of the invention to provide a call having a housing that accepts alternative sound directing attachments.

The foregoing objects, advantages and distinctions of the invention, among others, are found in a presently preferred deer call assembly that produces sounds ranging from the bleats and high pitched sounds of fawns and does to the low pitched grunts of bucks. The pitch is adjustable with a slide actuator that manipulates a reed restraint that captures a reed to an adjacent tone board. Reciprocating movements of the slide can be effected with the finger.

In a preferred construction, a slide actuator is mounted to a dovetailed groove in a call housing. An arcuate, grooved collar depends to capture an O'ring reed restraint. The O'ring is concentrically mounted over a reed and an adjacent grooved, tone board. The reed is rigidly secured to the tone board and a plug at one end with a peg. The plug is keyed to the housing groove.

In one preferred configuration, the reed exhibits peripheral edges that taper outward as the reed extends to the end of the tone board. A wide billed end of the reed projects beyond the longitudinal sides of the tone board. The wide-billed reed enhances the high and low ends of the sound range. The wide-billed reed also displaces calling air pressure and reduces possible freeze-up.

Still other objects, advantages and distinctions of the invention will become more apparent from the following description with respect to the appended drawings. Considered alternative constructions, improvements or modifications are described as appropriate. The singular features may also be combined into a variety of different combinations. The following description should therefore not be literally construed in limitation of the invention. Rather, the scope of the invention should be broadly interpreted within the scope of the further appended claims.

BRIEF DESCRIPTION OF THE DRAWINGS

FIG. 2 shows a partially sectioned front view of the call housing.

FIG. 3 shows a right side view of the call housing.

FIG. 4 shows a front view of the end plug and tone board.

FIG. 5 shows a right side view of the end plug and tone board.

FIG. 6 shows a left side view of the end plug and tone board.

FIG. 7 shows a front view of a peg piece.

FIG. 8 shows a right side view of the peg piece.

FIG. 9 shows a partially sectioned and partially cutaway front view of a sound directing tube.

FIG. 10 shows a right side view of the sound directing tube.

FIG. 11 shows a front view of the reed.

FIG. 12 shows a top view of the reed.

FIG. 13 shows a front view of the reed restraint slide assembly.

FIG. 14 show a right side view of the reed restraint assembly.

DESCRIPTION OF THE PREFERRED EMBODIMENT

Figure 1:
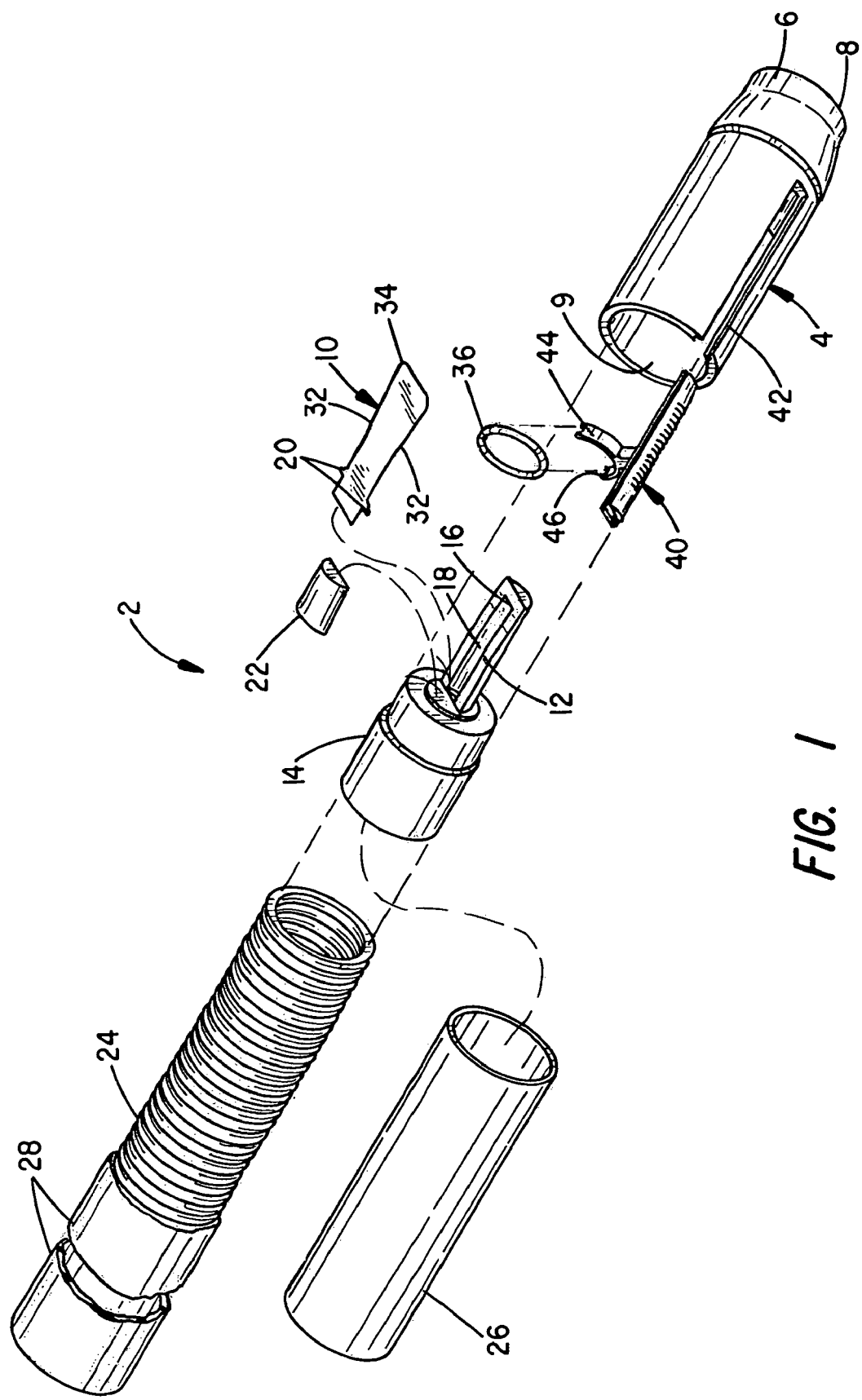
FIG. 1 shows a perspective view in exploded assembly of the animal call of the invention.

With attention to FIG. 1, a perspective view is shown in exploded assembly to the animal call 2 of the invention. The depicted call 2 is constructed to mimic the sounds of deer, but can be constructed to mimic any variety of birds and animals. The call produces sounds that mimic both fawns and does as well as bucks and all of which sounds can be inconspicuously produced without having to disassemble the call 2.

The call provides a body or housing 4 that is supported with the hand. FIGS. 2 and 3 show additional views to the housing 4. A shaped open-end or mouthpiece 6 provides an outer surface 7 that is captured by a user's mouth. Air is blown through an open end 8 into a hollow cavity or sound chamber 9 of the housing 4.

The air is forced to engage an internal reed 10. The reed 10 is mounted to produce sounds ranging from bleats to grunts. Injected air induces the reed 10 to vibrate relative to an underlying tone board 12 that extends from a ported end piece or plug 14. The air engages a tapered end 16 of the tone board 12, passes along a longitudinal channel 18 of the tone board 12, and lifts the reed 10 to induce resonance in the reed 10 and a related sound. See also FIGS. 4-6 for front, right and left end or side views of the plug 14 and wherein additional details to the plug end 14 and tone board 12 are depicted.

The reed 10 includes a pair of lateral protrusions 20 that limit the insertion depth of the reed into the plug 14. The reed 10 is secured to the plug 14 with a tapered peg 22 and front and end views of which are shown at FIGS. 7 and 8. A portion of the channel 18 is exposed through the plug end 14 and the developed sounds are emitted from the end of the plug 14.

Alternative sound directing or resonance attachments 24 and 26 can be attached to the plug 14. The resonance attachment can be constructed to a variety of desired shapes and/or from a variety of different materials to direct and/or further shape the produced sounds. FIGS. 9 and 10 show additional details to the tubular attachment 24 and which is constructed of a hollow length of corrugated plastic tube material 28 and over which an elastomer material or sleeve 30 is mounted. The tube 24 is generally flexible and can be bent to direct sound in a variety of directions. The material used to construct the resonance attachment can also effect the timber of the elicited sound. That is, tubes 24 or 26 constructed of rigid materials (e.g. hard plastic, metal) tend to produce higher pitched sounds versus the preferred corrugated/covered tube 24. Any of the tubes 24 or 26 can exhibit widened portions at the open-end to provide a degree of amplification.

The reed 10 can exhibit a variety of shapes. The presently preferred reed 10 is shaped to exhibit outward flared, tapered peripheral edges 32 that extend forward of the flanges 20. The edges 32 project beyond the lateral sides of the tone board 14. The edges 32 also terminate in a relatively wide bill 34 that exhibits a width substantially wider than the underlying tone board 16. The width of the bill 34 can exhibit a width in excess of 125% the width of the tone board. The details of the reed 10 are shown in enlarged scale at the front and top views shown at FIGS. 11 and 12. Reeds 10 that are as narrow or narrower than the tone board 16 can also be used.

The wide bill 34 adds weight to the tip of the reed 10 to reduce the vibrations, when a reed restraint 36 is set to related buck settings, and produce a more coarse sound of an older buck. When the restraint 36 is set to fawn and doe settings, the wider tip forces the user to place more air across the reed 10, which tightens the vibrations to a higher pitch. The extension of the edges 32 and wide bill 34 beyond the lateral sides of the underlying tone board 16 also causes vibrations at the peripheral edges 32 and the tip 34 versus other animal calls, which don't extend beyond the sides of the tone board and rely on vibrations solely at the tip. The wide bill or tip 34 is thus more responsive to the caller's blowing. The wide bill or tip 34 is also less susceptible to moisture build-up, which can be a particular concern during cold weather, when the reed can freeze to the tone board 16.

The pitch of the attained sounds is controlled with a restraint 36 (e.g. an elastomer O'ring or other band-shaped restraint) that concentrically mounts over the reed 10 and the tone board 16. The restraint 36 desirably contacts a significant portion of the reed 10 to the underlying tone board 16. The presently preferred O'ring restraint 36 can be selectively manipulated anywhere desired along the length of the reed 10 to vary the pitch. Grooves, such as provided in the prior art, do not limit movement or pitch. The O'ring 36 is manipulated with a slide actuator 40 that is fitted to a dovetailed groove 42 in the housing 4. An arcuate collar piece 44 depends from the actuator 40 and provides a groove 46 that captures a portion of the O'ring 36.

Although an elastomer O'ring or band-shaped restraint 36 is presently preferred, a variety of other endless band type restraints constructed to a variety of shapes and/or from a variety of materials might be secured around the reed 10 and tone board 16. A restraint 36 that is not endless might also be used, provided it extends beyond the peripheral edges 32 and retains the restraint 36 to the tone board 16. For example, a C-shaped piece constructed from or covered with rubber, felt or other suitable material can be mounted over the collar 44. Provided the cover piece contacts the reed 10, a similar range of sounds can be obtained with movement of the collar 44. Knurling and/or ridges 48 at the actuator 40 facilitate manipulation of the actuator 40 with the fingers. A projection 50 at the plug 14 aligns with the groove 42 to key the plug 14 and tone board 16 to the housing 4. The projection also limits the travel range of the slide actuator 40.

As the actuator 40 is manipulated longitudinally in a reciprocating fashion, the O'ring restraint 36 moves to-and-fro along the reed 10 and tone board 16 to selectively vary the resonance and pitch of the reed 10. The movement of the O'ring 36 also serves to prevent the reed 10 from freezing to the tone board 14 and/or clear a frozen reed 10 without having to disassemble the call 2.

While the invention has been described with respect to considered alternative assemblies and considered improvements or alternatives thereto, still other assemblies may be suggested to those skilled in the art. It is also to be appreciated that selected ones of the foregoing components can be used singularly or can be arranged in different combinations to provide a variety of further improved animal call assemblies. The foregoing description should therefore be construed to include all those embodiments within the spirit and scope of the following claims.

What is claimed is:

1. An animal call comprising:
   a) a hollow housing having a through bore extending between inlet and outlet ends and an intermediate sound chamber and including an aperture extending through a sidewall of said housing in communication with said sound chamber and wherein air directed from said inlet end to said outlet end produces sound;

b) an elongated tone board mounted in said sound chamber and having a coextensive longitudinal flat surface and a longitudinal channel recessed into said flat surface, wherein a forward portion of said flat surface declines at an acute angle relative to an aft portion that extends coaxial to said housing, and wherein the forward portion mounts adjacent said inlet end;

c) a flat elongated reed wherein laterally opposed peripheral edges define a first portion having parallel peripheral edges and a second flared portion having peripheral edges that flare outward at an acute angle as they extend from the first portion, and wherein the flared edges of the second portion extend to span a width in excess of 125% of the forward portion of the tone board;

d) an elastomer O'ring mounted in circumscribing contact with said reed and said tone board to restrain said reed to said tone board;

e) a plug mounted in the housing bore to secure the aft portion said tone board and the first portion of said reed to the housing outlet end with said reed mounted to overly said channel to define an air passage along said channel beneath said reed and wherein the flared second portion of said reed overlies and is displaced from the forward declining portion of said tone board adjacent the air inlet end of the housing such that air admitted from the inlet end vibrates said reed and directs air through said sound chamber along said channel; and f) an actuator having a cover piece mounted to the sidewall of said housing to cover said aperture, wherein said cover piece has a projecting collar piece that contains a groove, wherein an outer surface portion of said O'ring rests in said groove, and wherein said cover piece is mounted to slide to and fro along the housing at said aperture to contain air admitted to said housing within the sound chamber and is operable to reciprocally manipulate said O'ring along said reed to vary the sound emitted by said call.

2. A call as set forth in claim 1 wherein the cover piece of said actuator and peripheral edges of the housing sidewalls at said interlock in a dovetail connection.

3. A call as set forth in claim 1 wherein the reed includes a flanged projection that extends laterally from a peripheral edge of the first portion to locate the reed relative to the plug and housing.

4. An animal call comprising:

a) a hollow housing having a through bore extending between inlet and outlet ends and an intermediate sound chamber and including an aperture extending through a sidewall of said housing in communication with said sound chamber and wherein air directed from said inlet end to said outlet end produces sound;

b) an elongated tone board mounted in said sound chamber and having a coextensive channel recessed into a longitudinal surface that extends from an aft portion to a forward portion of the channel mounted adjacent said inlet end;

c) a flat elongated reed wherein laterally opposed peripheral edges define a first portion having parallel peripheral edges and a second flared portion having peripheral edges that flare outward at an acute angle as they extend from the first portion, and wherein the flared edges of the second portion extend to span a width in excess of 125% of the forward portion of the tone board;

d) an elastomer member mounted in circumscribing contact with said reed and said tone board to restrain said reed to said tone board;

e) a plug mounted in the housing bore to secure the aft portion of said tone board and the first portion of said reed to the housing outlet end with said reed mounted to overly said channel to define an air passage beneath said reed and wherein the flared second portion of said reed is displaced from and above the tone board channel adjacent the air inlet end of the housing such that air admitted from the inlet end vibrates said reed and is directed through said sound chamber along said channel; and f) an actuator having a cover piece mounted to the sidewall of said housing to cover said aperture, wherein a portion of said cover piece contains a portion of said elastomer member, and wherein the cover piece is mounted to slide to and fro along the housing sidewall at said aperture to contain air admitted to said housing within the sound chamber and is operable to reciprocally manipulate said elastomer member along said reed to vary the sound emitted by said call.

5. A call as set forth in claim 4 wherein said elastomer member comprises an O'ring and wherein said cover piece includes a groove within which said O'ring rests.

6. An animal call comprising:

a) a hollow housing having a through bore extending between inlet and outlet ends and an intermediate sound chamber and including an aperture extending through a longitudinal sidewall of said housing in communication with said sound chamber and wherein air directed from said inlet end to said outlet end produces sound;

b) an elongated tone board mounted in said sound chamber and having a coextensive channel recessed into a longitudinal surface that extends from an aft portion to a forward portion of the channel mounted adjacent said inlet end;

c) a flat elongated reed extending from an aft end to a forward end and wherein the reed has laterally opposed peripheral edges that define an aft portion having parallel peripheral edges that extend to a forward portion which has peripheral edges that flare outward at an acute angle as they extend from the aft portion and wherein the flared edges of the forward portion extend to span a width in excess of 125% of a lower lying portion of the tone board;

d) an elastomer member mounted in circumscribing contact with said reed and said tone board to restrain said reed to said tone board;

e) a plug mounted in the housing bore to secure the aft portion of said tone board and the aft portion of said reed to the housing outlet end with said reed mounted to overly said channel to define an air passage beneath said reed and wherein the forward portion of the reed is displaced from and above the tone board channel adjacent the inlet end such that air admitted from the inlet end vibrates said reed and is directed through said sound chamber along said channel; and f) an actuator having a cover piece mounted to the sidewall of said housing to cover said aperture, wherein a portion of said cover piece covers an outer surface portion of said elastomer member, and wherein said cover piece is mounted to slide to and from along the housing sidewall at said aperture to contain air admitted to said housing within the sound chamber and operable to reciprocally manipulate said elastomer member along said reed to vary the sound emitted by said call.

7. A call as set forth in claim 6 wherein the reed includes a projection that extends laterally from a peripheral edge to locate the reed relative to the plug and housing.

8. An animal call comprising:
a) a hollow housing having a through bore extending between inlet and outlet ends and an intermediate sound chamber and including an aperture extending through a longitudinal sidewall of said housing in communication with said sound chamber and wherein air directed from said inlet end to said outlet end produces sound;
b) an elongated tone board mounted in said sound chamber and having a coextensive channel recessed into a longitudinal surface that extends from an aft portion to a forward portion of the channel mounted adjacent said inlet end;
c) a flat elongated reed extending from an aft end to a forward end;
d) an annular elastomer band mounted in circumscribing contact with said reed and said tone board to restrain said reed to said tone board;
e) a plug mounted in the housing bore to secure the aft portion of said tone board and the aft portion of said reed to the housing outlet end with said reed mounted to overly said channel to define an air passage beneath said reed and wherein the forward portion of the reed is displaced from and above the tone board channel adjacent the inlet end such that air admitted from the inlet end vibrates said reed and is directed through said sound chamber along said channel; and
f) an actuator having a cover piece mounted to the sidewall of said housing to cover said aperture, wherein said cover piece includes a projecting collar piece having a groove that extends transverse to said tone board and captures a displaced and exposed portion of the elastomer band, and wherein said cover piece is mounted to slide to and fro along the housing sidewall at said aperture to contain air admitted to said housing within the sound chamber and operable to reciprocally manipulate said elastomer band along said reed to vary the sound emitted by said call.

9. An animal call comprising:
a) a hollow housing having a through bore extending between inlet and outlet ends and an intermediate sound chamber and including an aperture extending through a longitudinal sidewall of said housing in communication with said sound chamber and wherein air directed from said inlet end to said outlet end produces sound;
b) an elongated tone board mounted in said sound chamber and having a coextensive channel recessed into a longitudinal surface that extends from an aft portion to a forward portion of the channel mounted adjacent said inlet end;
c) a flat elongated reed extending from an aft end to a forward end;
d) an elastomer O'ring mounted in circumscribing contact with said reed and said tone board to restrain said reed to said tone board;
e) a plug mounted in the housing bore to secure the aft portion of said tone board and the aft portion of said reed to the housing outlet end with said reed mounted to overly said channel to define an air passage beneath said reed and wherein the forward portion of the reed is displaced from and above the tone board channel adjacent the inlet end such that air admitted from the inlet end vibrates said reed and is directed through said sound chamber along said channel; and
f) an actuator having a cover piece mounted to the sidewall of said housing to cover said aperture, wherein said cover piece includes a collar that nests over an exposed portion of the O'ring, and wherein said cover piece is mounted to slide to and fro along the housing sidewall at said aperture to contain air admitted to said housing within the sound chamber and operable to reciprocally manipulate said O'ring along said reed to vary the sound emitted by said call.

* * * * *